Dec. 5, 1933.   F. S. McCULLOUGH   1,937,706
SEAL FOR VITREOUS ARTICLES
Original Filed April 12. 1928
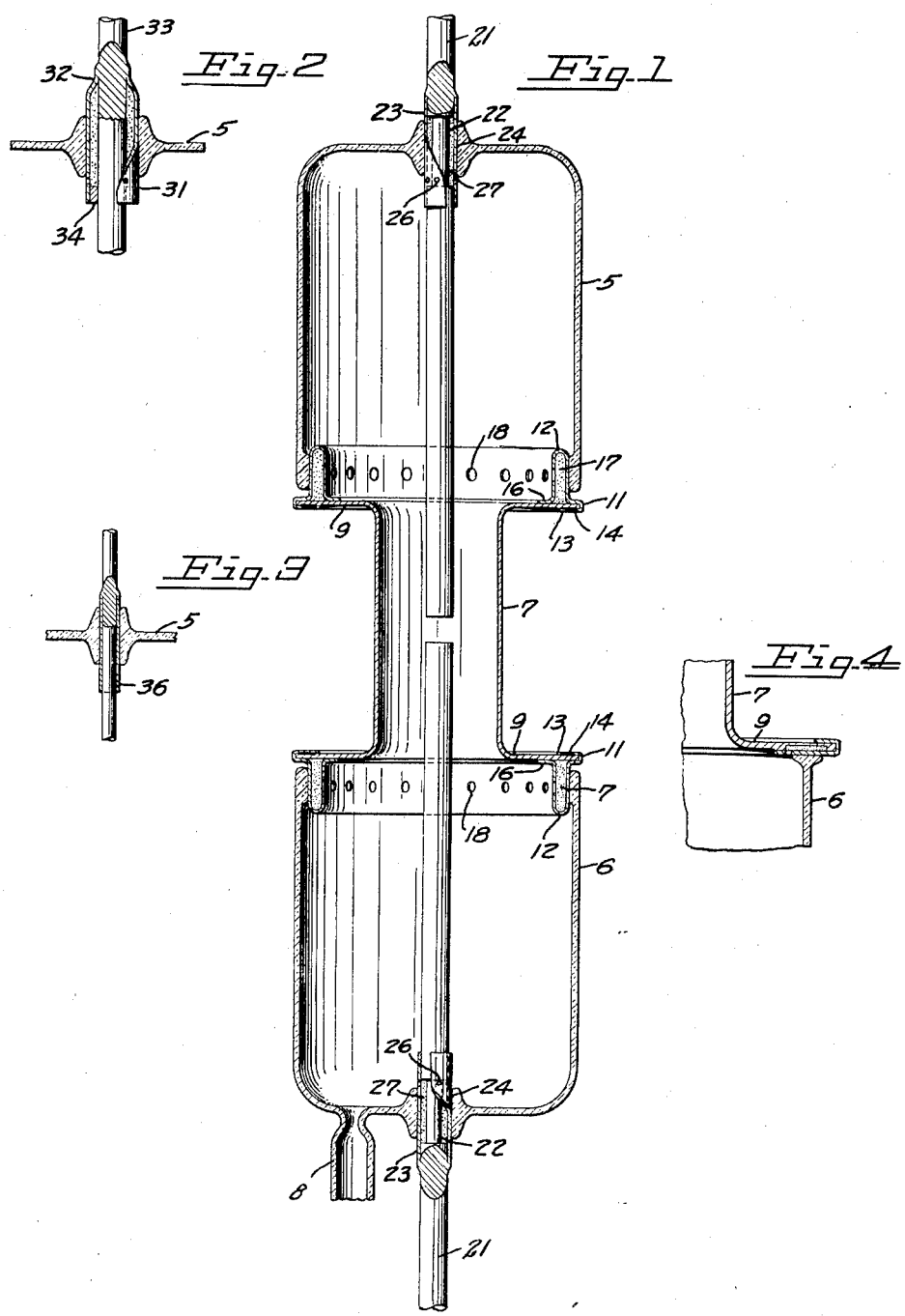
INVENTOR
FREDERICK S. McCULLOUGH
BY Charles S. Evans
HIS ATTORNEY.

Patented Dec. 5, 1933

1,937,706

UNITED STATES PATENT OFFICE 1,937,706

SEAL FOR VITREOUS ARTICLES

Frederick S. McCullough, Edgewood, Pa., assignor to The Union National Bank of Pittsburgh, Pittsburgh, Pa.

Original application April 12, 1928, Serial No. 269,439. Divided and this application April 12, 1928. Serial No. 269,440

11 Claims. (Cl. 250—27.5)

My invention relates to the art of glassworking, and particularly to methods of sealing large metal parts to or through the walls of vitreous vessels to produce an impervious joint.

The broad purpose of my invention is to produce a seal which is at once capable of sustaining relatively heavy weights, gas-tight, and not subject to cracking due to differential expansion of the parts.

An object of my invention is to provide means for removing from a glass vessel any gas which may be liberated from a heated seal.

Another object of my invention is to provide a seal which acts as a cushion between glass and metal.

Still another object of my invention is to provide a seal which does not materially increase the electrostatic capacity of the device in which it is used.

My invention possesses other objects and valuable features, some of which will be set forth in the following description of my invention which is illustrated in the drawing forming part of the specification. It is to be understood that I do not limit myself to the showing made by the said description and drawing, as I may adopt varying forms of my invention within the scope of the claims.

Referring to the drawing;—

Fig. 1 is an axial sectional view of an embodiment of my invention.

Figs. 2, 3 and 4 are fragmentary sectional views showing other modifications of my invention which are useful in certain special applications.

Broadly considered, my invention is a coupling for uniting a vitreous and a metallic element comprising a coupling member bridging a portion of one of the elements and fused in its reach to the other element. The bridging member is made sufficiently thin so that it has less strength than either the vitreous element or its junction therewith; and differential expansion, instead of breaking the vitreous element merely deforms the bridging member. Where the coupling is used in an evacuated vessel, a sorptive material or "getter" may be retained beneath the reach of the bridging member, which is preferably provided with ports opening into the evacuated chamber.

Seals of this type are applicable to quartz lamps, vacuum tubes, chemical glassware, and many other uses. In electrical discharge apparatus the bridged element is usually the metallic one. In this case the thin and deformable bridging member is supported by the metallic element on both sides of its point of fusion to the vitreous element, and is thus capable of supporting large weights in spite of its own intrinsic weakness. A lead may be carried through the wall of the vessel by this method without materially increasing its electrostatic capacity, which may be a highly important feature in apparatus of this class. Moreover, the getter beneath the bridging member is located close to the seal, where it can quickly remove any gas liberated therefrom. As a seal can never be as thoroughly degasified as the other parts of apparatus of this character, the getter is thus in the position where it is most effective.

The embodiment of my invention which I have chosen for detailed description is a vacuum lightning arrester.

This comprises an evacuated container formed of a pair of glass vessels 5 and 6, between which is sealed a metallic tubular part 7. An exhaust tubulation 8 is provided in the glass vessel 6. The ends of the tube 7 are flared outwardly to form flanges 9 which serve to radiate a large portion of the heat, which may be generated within the tube, before it reaches the seal.

Welded or otherwise hermetically secured to the outer rim of the flange is an annular coupling member, preferably of copper, generally designated by the reference figure 11. The coupling is preferably formed of metal of a substantially uniform thickness, and is so proportioned with respect to the glass to which it is fused that the glass has the greater strength. Differential expansion or contraction between the glass and the coupling will, therefore, cause deformation of the latter instead of breaking either the glass or the seal.

The cross section of the coupling comprises a U-shaped portion 12, which bridges a portion of the flange 9. The outer U-wall has at its end a flange 13 which is hermetically joined to the flange 9, preferably by a weld 14, forming a fixed abutment. The inner wall of the U is also provided with a flange 16 at its end which rests against the flange 9 to form the other abutment. The flange 16 may be spot-welded to the flange 9 at a few points. Between the walls of the U is a space which may be filled with a getter 17 which may be tantalum, calcium, thoria, or any of the materials used for this purpose. Gas in the tube has access to the getter through ports 18 in the inner U walls.

The glass elements 5 and 6 are fused to the outer leg or limb of the U walls in the usual way, care being taken that little perpendicular pressure is exerted on the wall of the coupling.

Cylindrical leads 21 are sealed through the ends of the glass parts 5 and 6. These leads comprise heavy rods in which are formed grooves 22. Bridging the grooves are sleeves 23, also preferably of copper and designed with respect to the same considerations of relative strength as govern the design of the couplings 11. The outer end of each sleeve is hermetically secured to the rod 21, as by welding. The inner end overlies the rod and is supported thereby, but there is no rigid connection between the two. The glass is fused to the reach of the sleeve between its abutments on the rod, forming the seal 24, so that the full radial strength of the rod is never exerted on the seal by differential expansion or contraction. Ports 26 open from the groove into the vacuum chamber, and the groove may contain a getter 27 as described above.

It will be seen that the principle of both seals is the same. The glass is sealed to a coupling member which is weak and deformable by the stresses due to temperature changes in metal or glass, but which is so supported as to be strong and rigid against bending or weight stresses. These same principles may be used in other modifications. Thus Fig. 2 shows a construction in which the groove is omitted, one end of the sleeve 31 being drawn down to a neck 32 which conforms in diameter to the rod 33 to which it is welded. A collar 34 on the rod forms the other abutment for the sleeve.

In Fig. 3 is shown a construction which may be used with leads of small diameter. In this case the sleeve 36 is an easy sliding fit over the rod, to which one end is welded. Owing to the small size of the parts the space between the lead and the sleeve, even though it is only of the order of one thousandth of an inch in width is sufficient to prevent the full radial strength of the lead being exerted against the glass, and in this case, as in the other forms shown, we have a true bridging of the lead by the sleeve, even though the space beneath the reach is microscopic. The free end of the sleeve rests on the lead as an abutment if the joint be stressed, and, therefore, the leverage of the sleeve on the juncture is not such as readily to cause fracture.

Fig. 4 illustrates the use of the grooved construction in connection with a flange joint. Other modifications of my invention will suggest themselves to those skilled in the art.

By "bridging", I mean spanning over, and contacting at the ends or abutments, but spaced in the reach or portion between abutments. By the term "fused to", I mean that the elements are heated until one of them is softened and adheres to the other upon contact therewith. In my Patent No. 1,897,761, dated February 14, 1933, I have made specific claims to the seal for the leads, and the present application is, in effect, a division of my said patent.

I claim:

1. A coupling for joining a metallic element and a vitreous element comprising an annulus of substantially U-shaped cross section with its opening bridging a portion of the metallic element and having one limb of the U fused to the vitreous element and the other limb ported.

2. A coupling for joining a metallic element and a vitreous element comprising a member of substantially U-shaped cross section bridging a portion of the metallic element and having one wall of the U fused to the vitreous element and the other wall ported, and a getter in the chamber between the walls of the U.

3. A coupling for joining a metallic element to a vitreous element comprising an annular rim of metal more flexible than the metallic element and of substantially U-shaped cross section with its opening bridging a portion of the metallic element and hermetically united therewith and fused in its middle part with the vitreous element.

4. A coupling for joining a tubular metallic element to a tubular vitreous element comprising an annular member of substantially U-shaped section secured at its ends to the metallic element and fused between its ends to the vitreous element, and a getter in the chamber between the walls of the U, the inner wall being ported.

5. A composite vessel having a metal body portion and a vitreous body portion, and a joint member connecting the two portions comprising a continuous channel member of substantially U-shaped cross-section between the adjacent portions of the metal and vitreous members, said U-shaped member having one edge thereof hermetically sealed to the metal portion of the body and having the vitreous body fused to a face of the channel.

6. A composite vessel adapted to be subjected to drastic thermal changes comprised of a metal body and a vitreous body, and a joint between the two bodies extending continuously along the adjacent portions thereof, said joint comprising a relatively flexible channel member having an inner limb and an outer limb, to the outer limb of which the vitreous portion of the vessel is hermetically sealed, an edge portion of the channel member being hermetically sealed to the metal body.

7. A composite vessel comprising a hollow metal body and a hollow vitreous body having adjacent portions, and a joint structure through which the adjacent portions are hermetically joined, said structure comprising a continuous channel member having an inner limb and an outer limb, interposed between the adjacent portions of the two members having one limb thereof rigidly connected and hermetically sealed on its outer face to the vitreous member and having the other limb thereof rigidly secured and hermetically sealed to the metal portion of the body, the intervening portion of the channel member providing a flexible connection between the metal body and the vitreous body.

8. A hermetically sealed vessel comprised of a metal body having a flange around one end thereof and a hollow vitreous body having an open end adjacent the flange, and a channel member of a metal more flexible than the metal body and having an inner limb and an outer limb, one limb of the channel member being sealed to the flange, and the other limb of the channel member being hermetically joined to the vitreous body.

9. A composite body of the class described comprising a hollow vitreous portion and a hollow metal portion, said hollow metal portion having a flange thereon extending transversely to the adjacent walls of the vitreous body, and a joint connecting the two comprising an annular member of substantially U-shaped cross-section having an inner limb, said joint extending into the vitreous body and to the outer limb of which the vitreous body is fused, the outer limb of the channel member having an outwardly turned ledge portion on which the flange of the metal body sets, the inner limb of the channel member having a ledge hermetically sealed to the flange on the metal body.

10. A coupling for joining a tubular metallic element to a tubular vitreous element comprising an annulus of substantially U-shaped section having an inner limb and an outer limb, said annulus being secured at the extremities of its limbs to the metallic element and having the vitreous element fused to one of the limbs of the U-shaped section.

11. A substantially gas tight vessel having a metal body part and a vitreous body part, the metal part of the body having a metal rim thereon comprising a coupling member, said rim being of substantially U-shaped section having an inner and an outer limb, one limb of said rim being hermetically joined to the metal body part, the vitreous part of the body being fused to the other limb of said U-shaped metal rim.

FREDERICK S. McCULLOUGH.

CERTIFICATE OF CORRECTION.

Patent No. 1,937,706. December 5, 1933.

FREDERICK S. McCULLOUGH.

It is hereby certified that error appears in the printed specification of the above numbered patent requiring correction as follows: Page 2, line 148, claim 9, after "limb" insert the words and an outer limb; and that the said Letters Patent should be read with this correction therein that the same may conform to the record of the case in the Patent Office.

Signed and sealed this 9th day of January, A. D. 1934.

F. M. Hopkins (Seal) Acting Commissioner of Patents.